United States Patent
Mayor et al.

(10) Patent No.: US 10,085,115 B2
(45) Date of Patent: Sep. 25, 2018

(54) LOCATION SUPPORT FOR EMERGENCY CALLS

(71) Applicant: Apple Inc., Cupertino, CA (US)

(72) Inventors: Robert Mayor, Half Moon Bay, CA (US); Glenn Donald MacGougan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/675,486

(22) Filed: Aug. 11, 2017

(65) Prior Publication Data

US 2018/0048990 A1    Feb. 15, 2018

Related U.S. Application Data

(63) Continuation of application No. 15/201,320, filed on Jul. 1, 2016, now Pat. No. 9,736,633, which is a continuation of application No. 14/848,184, filed on Sep. 8, 2015, now Pat. No. 9,386,414.

(60) Provisional application No. 62/107,973, filed on Jan. 26, 2015.

(51) Int. Cl.
*H04W 4/02* (2018.01)
*G01S 19/17* (2010.01)
*H04L 29/06* (2006.01)
*H04W 4/90* (2018.01)
*H04W 4/22* (2009.01)

(52) U.S. Cl.
CPC .............. *H04W 4/02* (2013.01); *G01S 19/17* (2013.01); *H04L 65/1006* (2013.01); *H04L 65/1069* (2013.01); *H04W 4/22* (2013.01); *H04W 4/90* (2018.02)

(58) Field of Classification Search
CPC ..... H04W 4/22; H04W 76/007; H04W 64/00; H04W 4/02; G08B 25/016
See application file for complete search history.

(56) References Cited

U.S. PATENT DOCUMENTS

| | | |
|---|---|---|
| 5,479,482 A | 12/1995 | Grimes |
| 6,091,362 A | 7/2000 | Stilp |
| 7,433,673 B1 | 10/2008 | Everson |
| 8,509,822 B1 | 8/2013 | Hou et al. |
| 8,718,593 B2 | 5/2014 | Singhal |
| 8,811,941 B2 | 8/2014 | Fuller, Jr. et al. |
| 9,386,414 B1 | 7/2016 | Mayor et al. |

(Continued)

OTHER PUBLICATIONS

Samsung Tech, "9 tips to use effective Samsung Galaxy S5," Google, Sep. 12, 2014, 2 pages.

*Primary Examiner* — Kashif Siddiqui
(74) *Attorney, Agent, or Firm* — Fish & Richardson P.C.

(57) ABSTRACT

System and method for submitting a location of a mobile device to a public service for providing emergency assistance are described. A mobile device can determine that a user is making an emergency call from the mobile device. The mobile device can then enable a location determination function of the mobile device and determine a location of the mobile device. The mobile device can determine the location in multiple attempts, including, in a first time window, attempting to determine a location with low uncertainty and, if the attempt fails, determining a location with high uncertainty in a second time window. The mobile device can then submit the location to a dispatcher through a mobile network operator.

30 Claims, 10 Drawing Sheets

(56) References Cited

U.S. PATENT DOCUMENTS

| | | | |
|---|---|---|---|
| 2005/0090225 A1 | 4/2005 | Muehleisen | |
| 2006/0276168 A1* | 12/2006 | Fuller, Jr. | H04M 11/04 |
| | | | 455/404.2 |
| 2008/0194226 A1* | 8/2008 | Rivas | H04W 64/00 |
| | | | 455/404.2 |
| 2009/0058720 A1* | 3/2009 | Shaw | G01S 5/0072 |
| | | | 342/357.31 |
| 2009/0176474 A1* | 7/2009 | Bajko | H04W 4/02 |
| | | | 455/404.1 |
| 2011/0177831 A1* | 7/2011 | Huang | G06F 17/3087 |
| | | | 455/457 |
| 2012/0309387 A1* | 12/2012 | MacGougan | H04W 64/00 |
| | | | 455/425 |
| 2014/0274116 A1* | 9/2014 | Xu | G01S 11/06 |
| | | | 455/456.1 |

* cited by examiner

LOCATION SUPPORT FOR EMERGENCY CALLS

CROSS-REFERENCE TO RELATED APPLICATION

This application is a continuation of U.S. patent application Ser. No. 15/201,320, filed Jul. 1, 2016, which is a continuation of U.S. patent application Ser. No. 14/848,184, filed Sep. 8, 2015, now issued as U.S. Pat. No. 9,386,414 on Jul. 5, 2016, which claims priority to U.S. Provisional Patent Application No. 62/107,973, filed Jan. 26, 2015, the entire contents of each of which is incorporated herein by reference.

TECHNICAL FIELD

This disclosure relates generally to location-based services.

BACKGROUND

An emergency call service, e.g., E911 as used in North America, links a mobile device with resources providing emergency services. When a mobile device places an emergency call, e.g., by dialing 9-1-1, a location of the mobile device can be associated with the emergency call and submitted to a public safety answering point (PSAP). A dispatcher can then provide the location to a police department, a fire department, emergency medical services or other public services. The location can be geographic coordinates determined by a satellite positioning system, e.g., GPS. Under certain circumstances, the geographic coordinates may be absent or inaccurate. For example, satellite signals may be too weak or absent for location determination when the mobile device is indoors. Location functions of the mobile device may be disabled. In such situations, the location of the mobile device may not be immediately and automatically available to a PSAP.

SUMMARY

Techniques for submitting a location of a mobile device to a public service for providing emergency assistance are described. A mobile device can determine that a user is making an emergency call from the mobile device. The mobile device can then enable a location determination function of the mobile device and determine a location of the mobile device. The mobile device can determine the location in multiple attempts, including, in a first time window, attempting to determine a location with lower uncertainty and, if the attempt fails, determining a location with higher uncertainty in a second time window. The mobile device can then submit the location and a value representing the uncertainty to a dispatcher through a mobile network operator.

The features described in this specification can achieve one or more advantages. For example, a mobile device implementing these features can provide a location of the mobile device to an emergency call service even when conventional location determination is not feasible, for example, when the mobile device is located indoors where satellite signals for positioning are poor. Accordingly, features described in this specification can increase the chance that a mobile device can successfully submit an accurate location to a PSAP.

The techniques described in this specification protect privacy of users who do not wish to enable location features of their mobile devices. Location functions can be enabled only temporarily before or during an emergency call, when acquiring emergence assistance at the right location is a goal of utmost importance. The mobile device can then turn off those functions immediately after submitting the location to an emergency call service, so as not to infringe on the privacy of users who do not use location functions.

The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

Like reference symbols in the various drawings indicate like elements.

DETAILED DESCRIPTION

Exemplary Emergency Call

Figure 1:
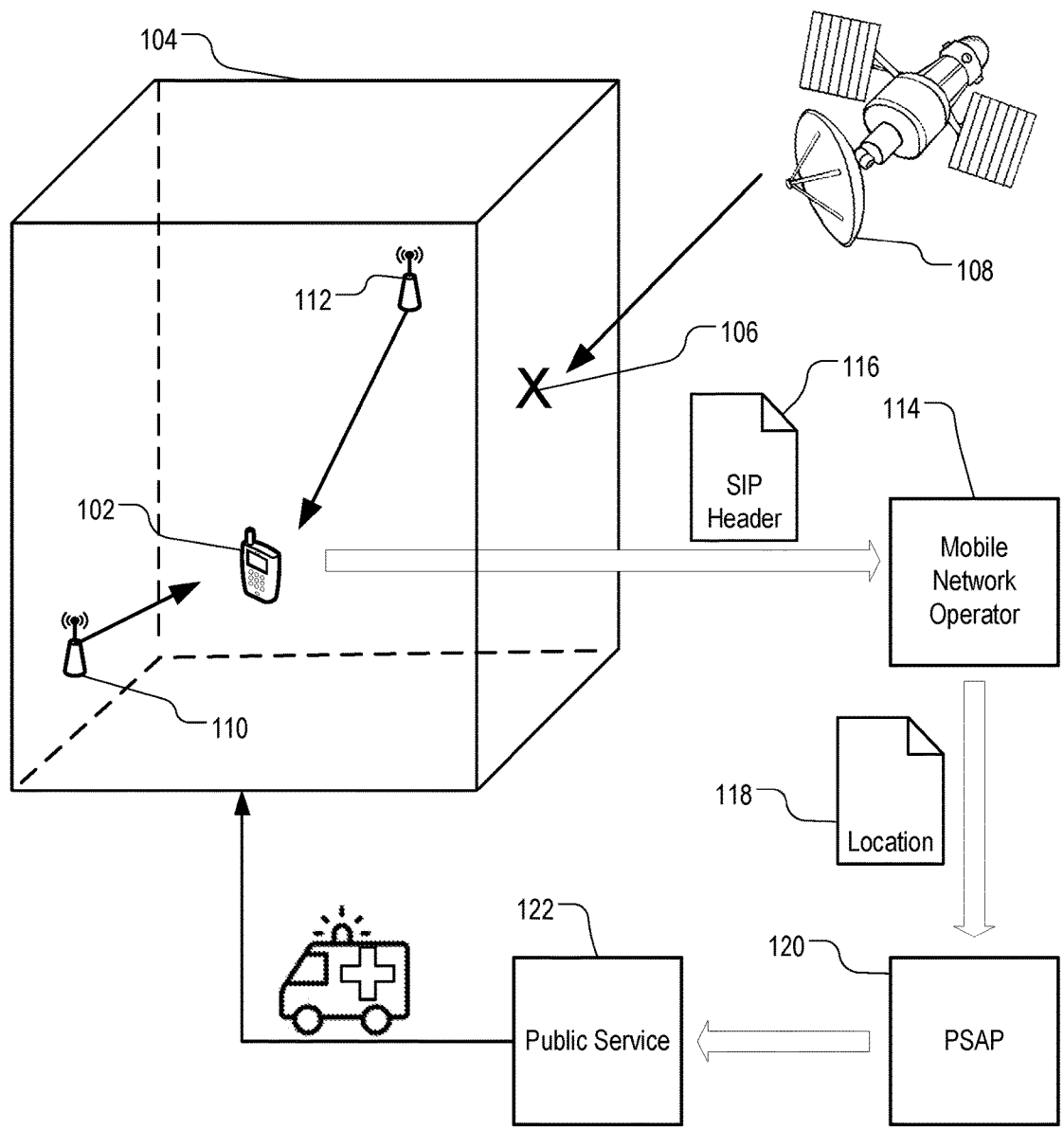
FIG. 1 is a diagram illustrating an exemplary mobile device making an emergency call.

FIG. 1 is a diagram illustrating an exemplary mobile device making an emergency call. Mobile device 102 can receive a user input making an emergency call on mobile device 102. The emergency call can be a telephone call through a cell tower, through a wireless access point, or a wired connection, to a public service providing emergency assistance. At time of receiving the user input, mobile device 102 can be located inside of structure 104. Structure 104 can completely or partially block (106) signals of a satellite positioning system 108 from reaching mobile device 102. Structure 104 can be, for example, a building, a tunnel or an airplane fuselage.

In response to the user input, mobile device 102 can determine a location of mobile device 102 for submitting to a PSAP. Determining the location can include multi-stage operations where, in a first stage, mobile device 102 attempts to determine a high-precision location using various techniques. If a threshold amount of time, e.g., four seconds, for determining the high-precision location has passed and mobile device 102 still cannot determine a high-precision location, mobile device 102 can attempt to determine a low-precision location in a second threshold amount of time, e.g., two seconds. The two thresholds are configured to balance the sometimes conflicting requirements of (1) giving mobile device 102 sufficient amount of time to determine a location as accurately as possible and (2) starting the call and submitting the location as quickly as possible due to the emergency nature of the call. Mobile device 102 can determine the location using signals of wireless access points 110 and 112 and a location database that stores locations of wireless access points 110 and 112. More details of the multi-stage operations of determining a location are described below in reference to FIG. 2.

Upon determining the location, mobile device 102 can submit the location to mobile network operator 114 for processing. In some implementations, mobile device 102 can submit the location using session initiation protocol (SIP). Mobile device 102 can encode the location, as well as uncertainty information on the location, e.g., uncertainty as measured in meters, in header 116 of a SIP request, e.g., a header of a SIP invite request or a SIP update request.

Mobile network operator 114 can parse SIP header 116 to determine the location and uncertainty of the location. Mobile network operator 114 can submit the location 118 to PSAP 120. PSAP 120 can submit the location 118 to public service 122, e.g., an ambulance service, which can dispatch emergency assistance, e.g., an ambulance, to the location.

Figure 2A:
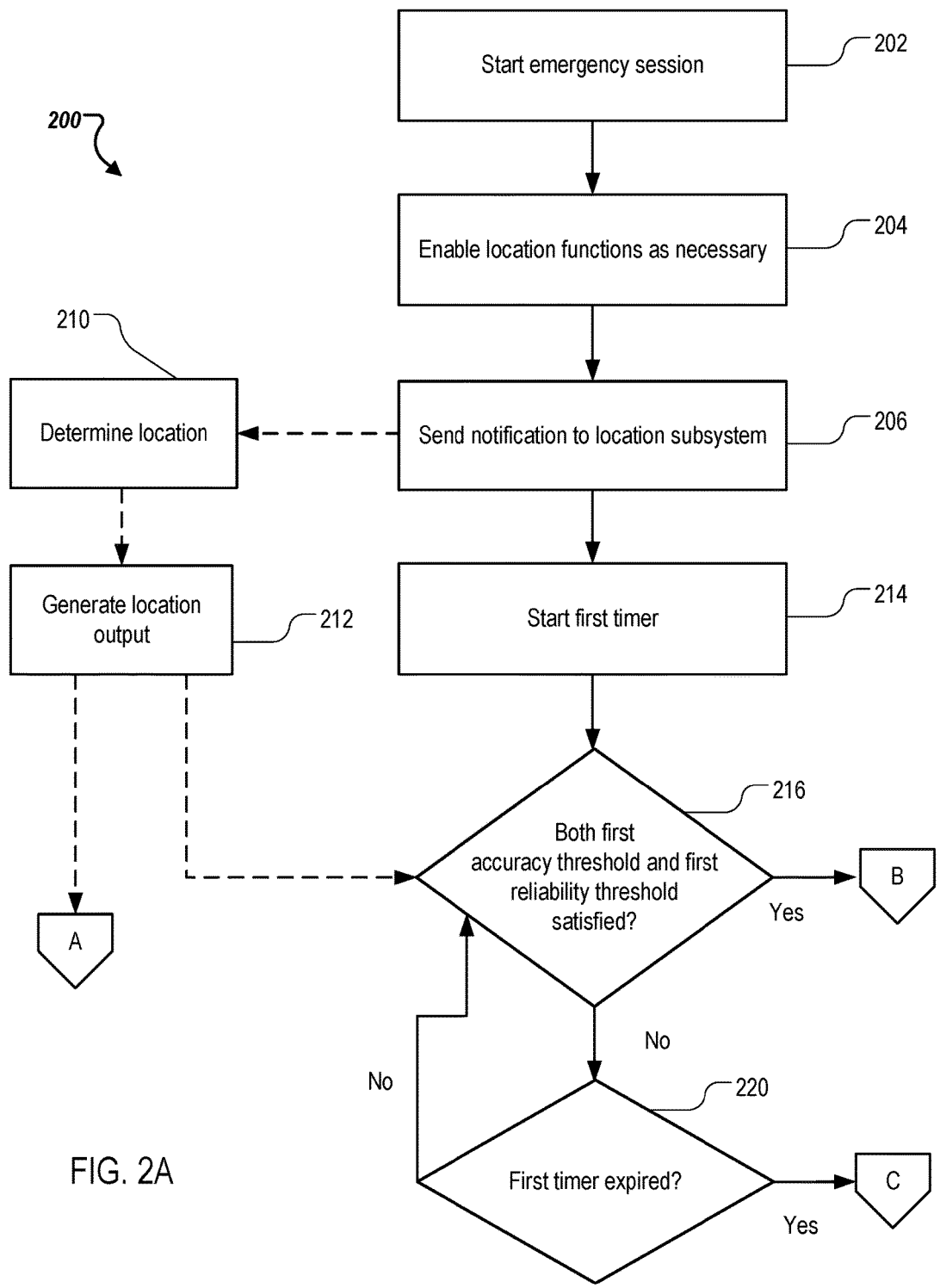
FIGS. 2A and 2B are flowcharts illustrating an exemplary process of providing location support for an emergency call.
Figure 2B:
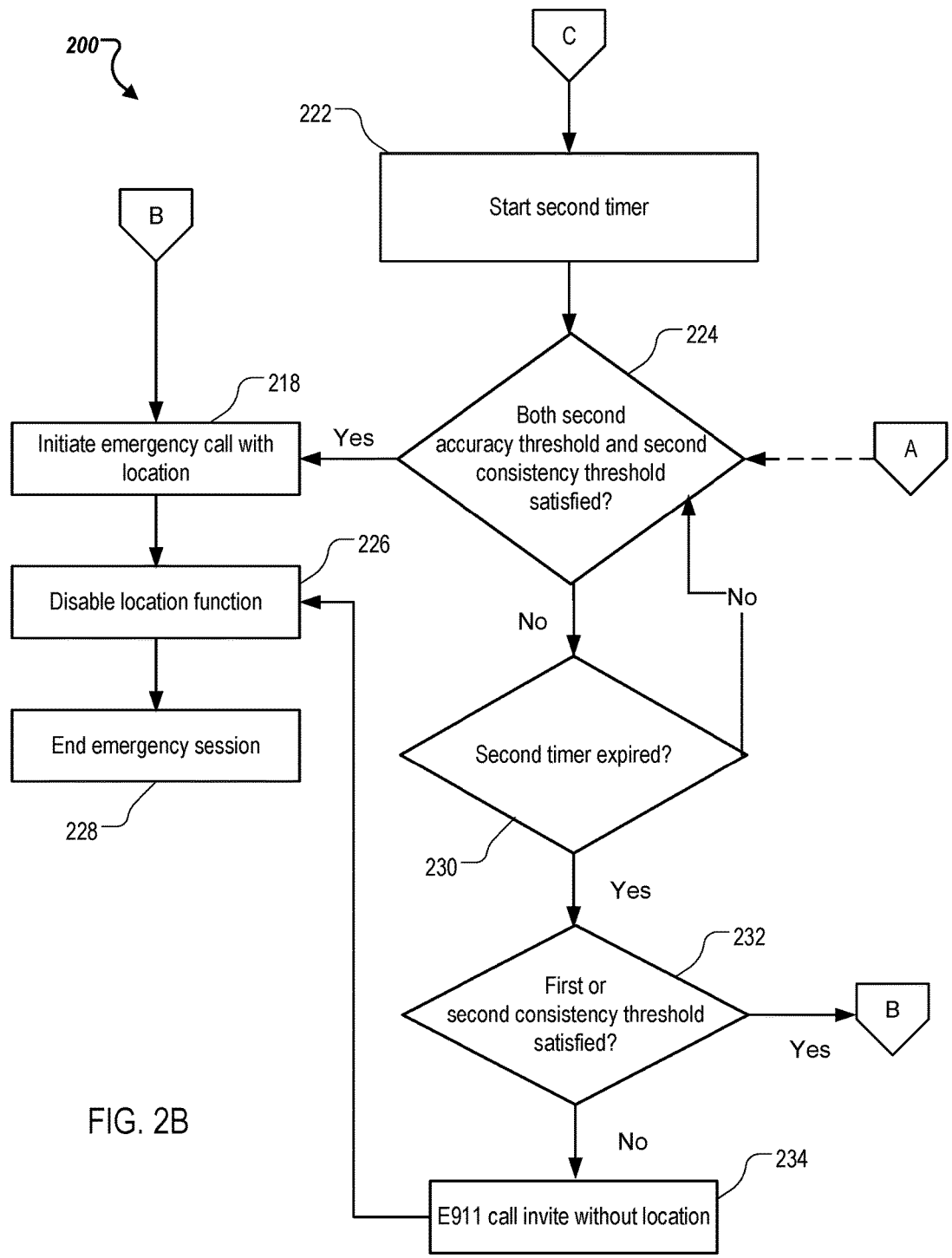

FIGS. 2A and 2B are flowcharts illustrating an exemplary process 200 of providing location support for an emergency call. Process 200 can be performed by a mobile device, e.g., mobile device 102 of FIG. 1.

The mobile device can start (202) an emergency session. The mobile device can start the emergency session in response to a user input dialing an emergency number, e.g., 9-1-1. The mobile device can enable (204) a location function of the mobile device upon starting the emergency session. Enabling the location function can occur when the location function is disabled, e.g., turned off, previously by a user. In some implementations, the mobile device enables all available location functions of the mobile device in response to the user input, including, for example, passive Wi-Fi™ scanning, Wi-Fi received signal strength (RSS) measurements for comparison with on-device Wi-Fi location fingerprints, cell identifier based location lookup, and each global navigation system (GNSS) function of the mobile device, e.g., GPS, GLONASS, BeiDou, DORIS, and Galileo.

After the location function is enabled, the mobile device can send (206) a notification to a location subsystem of the mobile device. The location subsystem can determine (210) the location of the mobile device using various approaches, e.g., by using satellite signals, cellular triangulation, and signals from wireless access points of a wireless local area network (WLAN). For convenience, the locations determined by these methods will be referred to as satellite locations, cellular locations, and wireless locations, respectively. The location subsystem can take these approaches to determine a location in various orders. For example, the location subsystem can first attempt to determine a satellite location using GPS signals, and then, if GPS signals are unavailable or insufficient, attempt to determine a wireless location using signals from wireless access points.

The location subsystem can determine an uncertainty value of the location and a degree of reliability of the location. The uncertainty value can be represented as a radius of a circle or sphere, or an average of axes of an ellipse or ellipsoid, in which the mobile device is located with a given certainty (e.g., 95 percent). The degree of reliability can be a value indicating how likely that location is correct. For example, in some implementations, the degree of reliability can correspond to how many wireless access points are detected by the mobile device and used to determine the location. More wireless access points can correspond to a higher degree of reliability. In some implementations, the degree of reliability can correspond to how much of the location determination is based on GPS signals. For example, if the location determination is partially based on GPS signals, the degree of reliability can be higher than the degree of reliability of a location determination that is completely based on wireless signals. Example implementations of determining the location and the uncertainty are described below in reference to FIG. 3

The location subsystem can generate (212) location output. The location output can include the location, estimated uncertainty of the location, and information on the degree of reliability of the location.

Upon starting (202) the emergency session, and before, during, or after the mobile device enables (204) the location functions and sends (206) the notification to the location subsystem, the mobile device can start (214) a first timer. The first timer can be set to determine a first time window, e.g., X seconds, in which the mobile device can determine a location. The location can be a satellite location, a cell location, or a wireless location. In some implementations, the mobile device can submit the location during initiation stage of an emergency call. The mobile device can specify the time window to be four seconds. In some implementations, the mobile device can submit a location after the emergency call already started. The mobile device can specify a time window that is longer than four seconds.

During the time window, the mobile device can evaluate whether the location output of stage 212 is suitable for submission to a mobile network operator. To evaluate, the mobile device can determine (216) whether uncertainty of the location satisfies a first uncertainty threshold, and whether a degree of reliability of the location satisfies a first reliability threshold. For example, the mobile device can determine that the uncertainty satisfies the first uncertainty threshold upon determining that the uncertainty, as provided in the location output, is less than a pre-specified number of meters, e.g., 65 meters.

The mobile device can determine whether the degree of reliability of the location satisfies a first reliability threshold in various ways. For example, in some implementations, the mobile device can determine that the degree of reliability of the location satisfies a first reliability threshold upon determining that the number of wireless access points that are (1) detected by the mobile device, (2) each associated with a location, and (3) used to estimate a location of the mobile device exceeds a pre-specified number, e.g., five.

In some implementations, the mobile device can determine that the degree of reliability of the location satisfies a first reliability threshold upon determining that a previous location determined based on satellite signals can confirm a wireless location. For example, the mobile device can determine the last time the mobile device determined a location using satellite signals was N minutes before determining a wireless location. The "N minutes" can be a duration that is shorter than a threshold time in which the mobile device can travel a distance that is longer than a threshold number of meters. Although the mobile device determined the wireless location using fewer than the pre-specified number of wireless access points, the mobile device can confirm that the wireless location is reliable using the previously determined satellite location by increasing a value representing the degree of reliability.

In some implementations, the mobile device can determine that the degree of reliability of the location satisfies a first reliability threshold upon first determining a wireless location that, in itself, does not satisfy the first reliability threshold. The mobile device can use this wireless location as a coarse estimate to help a satellite positioning subsystem to search for satellites and to compliment the wireless location to derive a reliable location of the mobile device.

Upon determining that the uncertainty of the location satisfies the first uncertainty threshold, and that the degree of reliability of the location satisfies the first reliability threshold, the mobile device can initiate (218 of FIG. 2B) an emergency call. Initiating the emergency call can include submitting a header of a request of a communication protocol, e.g., a SIP invite request, to a mobile network operator for parsing.

Upon determining that the uncertainty of the location does not satisfy the first uncertainty threshold, or that the degree of reliability of the location does not satisfy the first reliability threshold, the mobile device can continue waiting for the location output of stage 212. The mobile device can determine (220) whether the first timer has expired, indicating that the first time window is closed. If the first time window is still open, the mobile device continues to wait for the location output, or to evaluate a location output that is last provided by the location subsystem, including determining whether the uncertainty of the location satisfies the first uncertainty threshold, and whether the degree of reliability of the location satisfies the first reliability threshold.

If, at stage 220, the mobile device determines that the first time window has closed, and that the uncertainty of the location still does not satisfy the first uncertainty threshold, or that the degree of reliability of the location still does not satisfy the first reliability threshold, the mobile device can start (222, of FIG. 2B) a second timer. The second timer can be set to determine a second time window, e.g., Y seconds, in which the mobile device can determine a location of the mobile device. In the second time window, the mobile device can wait for a location output from stage 212 and determine (224) whether uncertainty of the location satisfies a second uncertainty threshold, and whether a degree of reliability of the location satisfies a second reliability threshold. The mobile device can reduce the chance of failure to get a location by relaxing the first uncertainty threshold and relaxing the first reliability threshold. The failure can be failing to obtain a location or delaying the emergency call for too long.

For example, the mobile device can determine that the uncertainty satisfies the second uncertainty threshold upon determining that the uncertainty, as provided in the location output, is less than a pre-specified uncertainty threshold (e.g., 150 meters) that is greater than the first uncertainty threshold (e.g., 65 meters) as used in stage 216. Likewise, the mobile device can lower the reliability threshold. For example, the mobile device can determine that the second reliability threshold is satisfied upon determining that the number of wireless access points that are (1) detected by the mobile device, (2) each associated with a location, and (3) used to estimate a location of the mobile device exceeds a pre-specified number that is smaller than the number used in stage 216, e.g., three instead of five.

Upon determining, in stage 224, that the uncertainty of the location satisfies the second uncertainty threshold, and that the degree of reliability of the location satisfies the second reliability threshold, the mobile device can initiate (218) an emergency call and submit the location to a mobile network operator during initiation of the emergency call. Upon submission of the location, the mobile device can disable (226) the location function. Disabling the location function can be conditioned upon a state of the location function before starting (202) the emergency session. For example, the mobile device can disable the location function when the location function was in a disabled state before the emergency call.

The mobile device can end (228) the emergency session, for example, after a user hangs up.

Upon determining, in stage 224, that the uncertainty of the location does not satisfy the second uncertainty threshold, or that the degree of reliability of the location does not satisfy the second reliability threshold, the mobile device can continue waiting for the location output of stage 212 and evaluating the output. Meanwhile, the mobile device can determine (230) whether the second timer has expired, indicating that the second time window has closed. If the second time window is still open, the mobile device can continue to wait for the location output, or to evaluate a location output that is last provided by the location subsystem, including determining whether the uncertainty of the location satisfies the second uncertainty threshold, and second the degree of reliability of the location satisfies the second reliability threshold.

If the mobile device determines, in stage 230, that the second time window has closed, the mobile device can determine (232) whether a last location output from stage 212 satisfies the first or second uncertainty threshold, and whether the last location output from stage 212 satisfies the first or second reliability threshold. If the uncertainty of the location still does not satisfy any uncertainty threshold, or that the degree of reliability of the location still does not satisfy any reliability threshold, the mobile device can initiate (234) the emergency call without submitting a location, for example, by submitting a SIP invite without encoding location coordinates. The mobile device can then perform the operations of stages 226 and 228, as described above.

Figure 3:
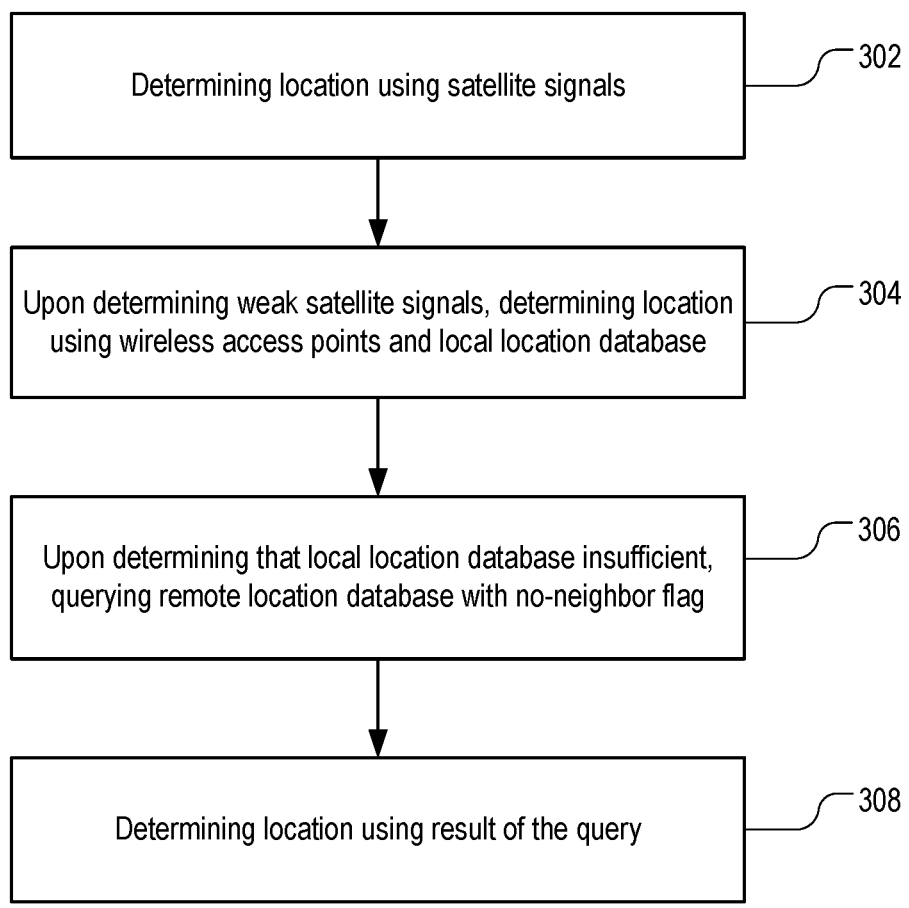
FIG. 3 is a flowchart illustrating exemplary process of determining a location of a mobile device.

FIG. 3 is a flowchart illustrating exemplary process 210 of determining a location of a mobile device. A location subsystem of a mobile device, e.g., mobile device 102, can attempt to determine (302) a satellite location of the mobile device. In parallel with determining the satellite location, or after the location subsystem fails to determine the satellite location, the location subsystem can determine (304) a wireless location of the mobile device Operations of determining the wireless location can be different from conventional techniques of determining a location of a mobile device using WLAN signals, to accommodate time limit required in emergency situations. To determine a wireless location, the mobile device can scan the wireless communication channels for a pre-specified amount of time. For example, the mobile device can scan channels 1-13 of an IEEE 802.11 wireless local area network, where each channel is scanned a pre-specified number of milliseconds, e.g., 100 ms.

The mobile device can determine identifiers, e.g., media access control (MAC) addresses, of wireless access points detected in the scan. The mobile device can perform a lookup in a local location database using the identifiers. The local location database can store a mapping between identifiers of wireless access points and known locations of the wireless access points. The local location database can be populated by various application programs before the emergency session starts.

If the location subsystem finds more than a threshold number (e.g., five) of detected wireless access points the known location of which are consistent with one another, the location subsystem can determine the wireless location using the known locations, e.g., by averaging the known locations. If the known locations of some of the detected wireless access points are inconsistent with one another, the location subsystem can determine whether one or more wireless access points are outliers to be excluded from the calculation, or data stored the local location database lacks integrity, based on how many wireless points are inconsistent. For example, if fewer than X percent of the wireless access points are inconsistent, the location subsystem can exclude the inconsistent wireless access points from location calculation as outliers; otherwise, the location subsystem can designate data stored in the local location database as lacking integrity.

If the location subsystem does not find a threshold number of detected wireless access points with consistent known locations, or the location subsystem determines that the local location database lacks integrity, the location subsystem can submit (306) a query to a remote location database for additional access point location data. The remote location database can be hosted on a server of a location service. The query can include identifiers of the detected wireless access points, or an estimated location calculated based on the detected wireless access points. The server may responds to the query by providing the locations of the detected wireless access points as identified in the query. In addition, the server may be configured to provide known location information of wireless access points located neighboring the estimated location or to the detected wireless points. A flag in the query can control whether to provide the additional location information. To reduce time associated with data transmission between the mobile device and the server, the mobile device can include the flag in the query specifying that no neighboring wireless access point information shall be included in the response to the query.

The location subsystem can receive a result of the query from the server, populate the local location database using the result, and determine (308) a wireless location of the mobile device using the result. The location subsystem can determine an estimated uncertainty of the wireless location according to the detected signals, e.g., based on signal strength of the detected signals. The location subsystem can determine a degree of reliability of the wireless location. For example, a wireless location that is corroborated by a satellite location determined in stage 202 may be assigned a higher degree of reliability than a wireless location that is calculated by excluding multiple outliers.

Exemplary Timelines

Figure 4:
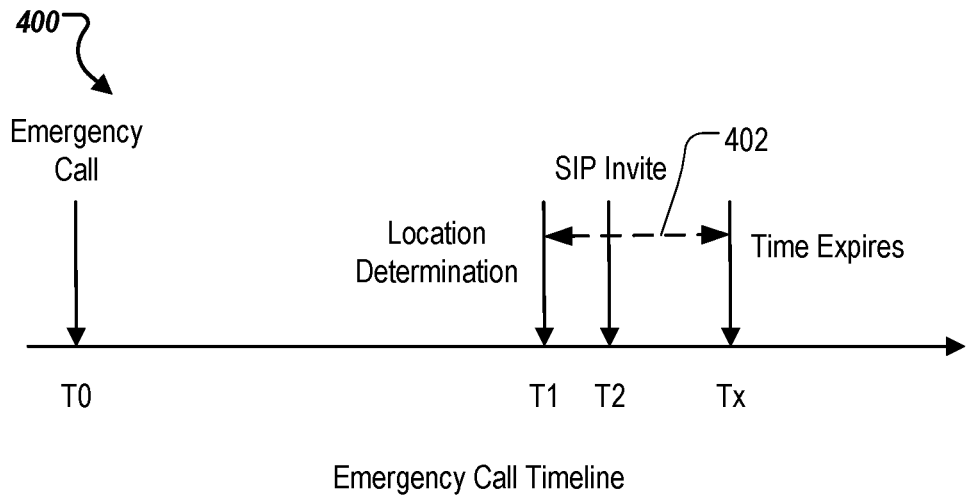
FIG. 4 illustrates an exemplary timeline of an emergency call in some implementations.

FIG. 4 illustrates exemplary timeline 400 of an emergency call in some implementations. At time T0, a mobile device, e.g., mobile device 102, can receive a user input for an emergency call. At time T1, a location subsystem of the mobile device determines a satisfactory location, which is location that satisfies an uncertainty threshold and a reliability threshold. Time T1 can be within the first time window or the second time window as described above in reference to FIG. 2.

At time T2 that is after the location subsystem determined the satisfactory location and before Tx, the mobile device can initiate emergency communication between the mobile device and a mobile network operator. The time period Tx-T0 is a maximum amount of time that the mobile device is permitted to delay the emergency communication in order to determine a location first. The time period Tx-T0 can be pre-set to six seconds. Initiating the emergency communication can include encoding location parameters, including geographic coordinates, in a SIP invite header, for example, between a <gml:pos> tag and a </gml:pos> tag in an XML document according to the protocol published in IETF RFC (Internet Engineering Task Force Request for Comments) 5491.

If, by time Tx, the location subsystem of the mobile device has not determined a satisfactory location, the mobile device can submit a SIP invite without encoding location information in the SIP invite. Accordingly, the mobile device can submit the SIP invite in time period 402, which is between T1 and Tx.

Figure 5:
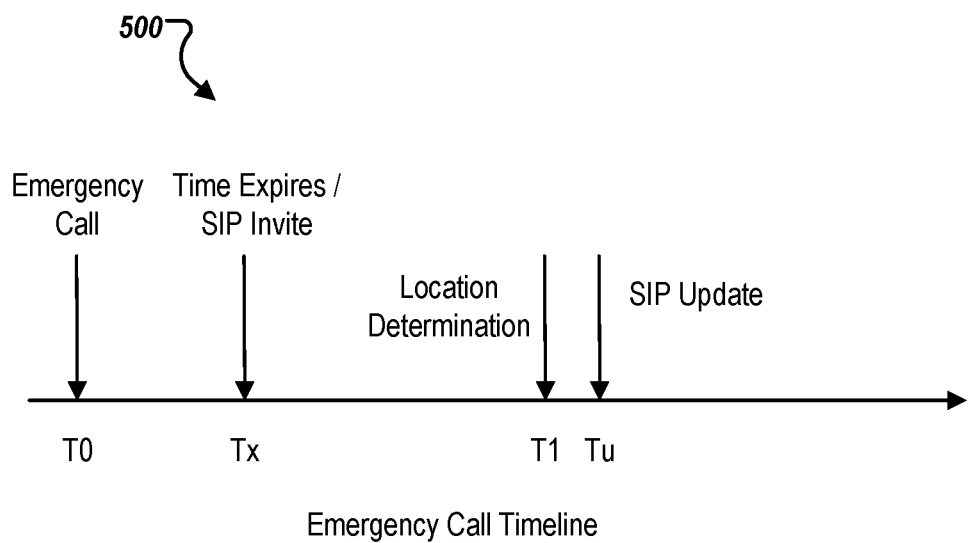
FIG. 5 illustrates an exemplary timeline of an emergency call in some implementations.

FIG. 5 illustrates exemplary timeline 500 of an emergency call in some implementations. At time T0, a mobile device, e.g., mobile device 102, can receive a user input for an emergency call. Upon receiving the user input, a location subsystem of the mobile device can attempt to determine a location of the mobile device.

At time Tx, the mobile device initiates an emergency session by sending a SIP invite to a mobile network operator. In some implementations, time Tx can correspond to end of a time period that the mobile device is allowed to delay to determine a location to send to the mobile operator. In some implementations, time Tx can be immediately after T0.

After Tx, and after an emergency call has established, a user of the mobile device can engage a conversation with an emergency call service. During the emergency call, at time T1, the location subsystem can determine a satisfactory location. Then, at time Tu, the mobile device can submit the location to the mobile network carrier in a header of a SIP update request.

The implementations described in FIG. 5 can be advantageous when the mobile device is located within range of few wireless access points and when satellite signals are weak. For example, the mobile device may be located indoors in a remote venue where only a single wireless access point is available and satellite signals are weak. Initially, the mobile device was unable to determine a satellite location sufficiently accurately from the satellite signals. The mobile device can determine a wireless location using signals from the wireless access point. The mobile device may be unable to determine a wireless location with a degree of reliability that satisfies the reliability threshold because too few wireless access points are available, in this example, only one is. The mobile device can use the wireless location to refine satellite search. Subsequently, with the help of the wireless location, the mobile device can determine a satellite location that is sufficiently accurate and reliable, e.g., a location that satisfies the first or second uncertainty and reliability thresholds as described above in reference to FIG. 2.

Due to the switching back and forth between satellite location determination and wireless location determination, the total time of determining a satisfactory location may be longer than permissible, if the emergence call proceeds only after the satisfactory location is determined. Accordingly, the mobile device can initiate an emergency call at time Tx, before the location is determined, and submit the location to a mobile network operator later, at time Tu. The mobile device thus masks the time to determine the location by the on-going emergency call.

Exemplary Device Components

Figure 6:
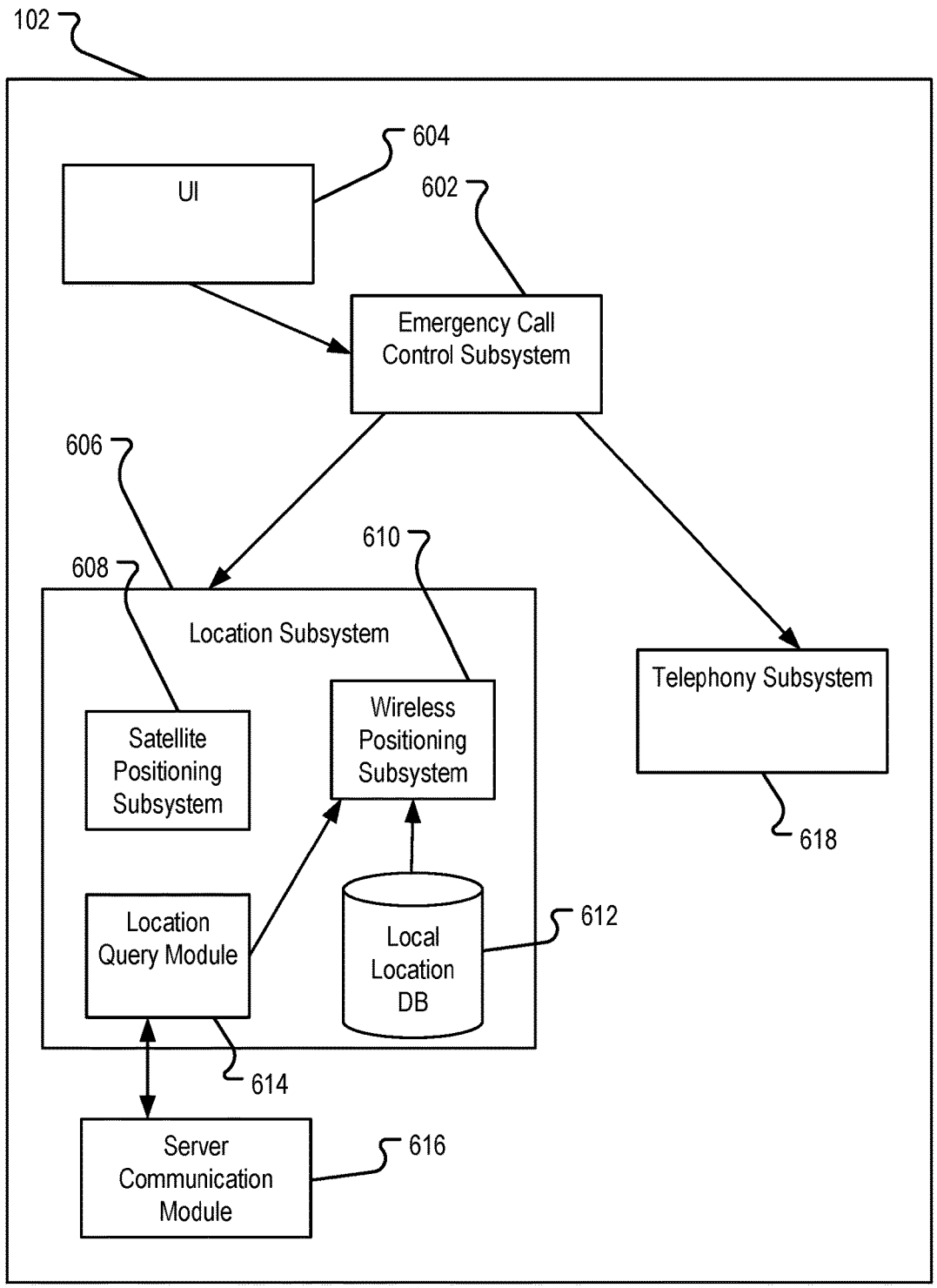
FIG. 6 is a block diagram illustrating components of an exemplary mobile device for providing location support to emergency calls.

FIG. 6 is a block diagram illustrating components of exemplary mobile device 102 for providing location support to emergency calls. Each component of exemplary mobile device 102 can include hardware and software, firmware, or cloudware components.

Mobile device 102 can include emergency call control subsystem 602. Emergency call control subsystem 602 is a component of mobile device 102 configured to manage location support for emergency calls. Emergency call control subsystem 602 can receive a user input from user interface 604 for an emergency call. User interface 604 can include a virtual or physical keyboard, or a speech recognition component, for receiving the user input, e.g., dialing 9-1-1.

Upon receiving the input, emergency call control subsystem 602 can enable location subsystem 606, if location subsystem 606 was previously disabled. Emergency call control subsystem can notify location subsystem 606 to determine a location. Meanwhile, emergency control subsystem can start the first timer as described in reference to FIG. 2.

Location subsystem 606 can include satellite positioning subsystem 608, e.g., a GPS component, configured to determine a satellite location. Location subsystem 606 can include wireless positioning subsystem 610 configured to determine a wireless location.

Wireless positioning subsystem 606 is a component of location subsystem 606 configured to scan wireless channels, detect wireless access points, query local location database 612 for locations of detected wireless access points, and determine a wireless location based on locations of the wireless access points.

Location subsystem 606 can include location query module 614. Location query module 614 is a component of location subsystem 606 configured to generate a query upon determining that information stored in local location database 612 is insufficient for determining a satisfactory wireless location. Location query module 614 can associate a flag with the query to indicate that mobile device 102 does not request location information on neighboring wireless access points. Location query module 614 can submit the query to server communication module 616 of mobile device 102. Server communication module 616 is a component of mobile device 102 configured to communicate with a server of a location service through a wired or wireless connection of a communications network. Upon receiving results of the query from the server through server communication module 616, location query module 614 can provide the results to wireless positioning subsystem 610 for determining a wireless location. Optionally, location query module 614 can store the results in local location database 612.

Mobile device 102 can include telephony subsystem 618. Telephony subsystem 618 is a component of mobile device 102 configured to communicate with a mobile network carrier using a protocol that is capable of submitting location information, e.g., SIP. Emergency call control subsystem 602, upon determining that a location from location subsystem 606 satisfies the uncertainty and reliability thresholds, can provide the location, as well as the uncertainty information, to telephony subsystem 618 for encoding into a header of the communication protocol for submission.

Exemplary Procedures

Figure 7:
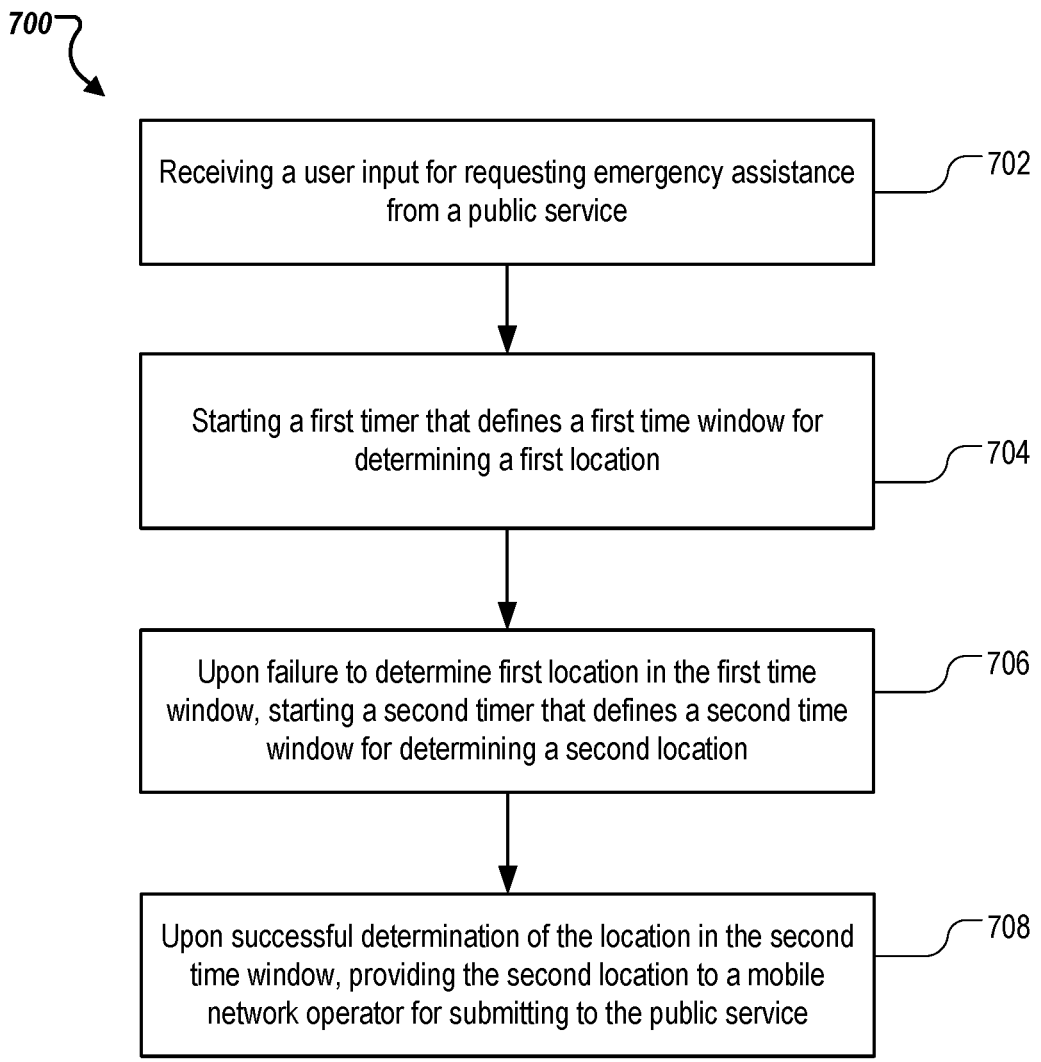
FIG. 7 is a flowchart of an exemplary process of providing location support for emergency calls.

FIG. 7 is a flowchart of exemplary process 700 of providing location support for emergency calls. A mobile device, e.g., mobile device 102 of FIG. 1 can perform process 700.

The mobile device can receive (702) a user input for requesting emergency assistance from a public service. The mobile device can connect to the public service through an emergency call service, e.g., an E911 system, a T911 system, a 112 system, or a 119 system, as used in various countries or regions.

The mobile device can start (704) a first timer that defines a first time window. In the first time window, the mobile device attempts to determine a location of the mobile device that satisfies a first uncertainty threshold and a first reliability threshold. In the first time window, and before attempting to determine the location, the mobile device can determine that a location function of the mobile device is in a disabled state. In response, the mobile device can enable the location function. The location function can be a feature of determining a location using satellite signals or signals from a wireless local area network.

The mobile device can determine the location of the mobile device using signals from one or more wireless access points. The first reliability threshold can be defined at least in part by a first number of wireless access points that are observed by the mobile device, that are used by the mobile device to determine the location, and that are consistent with the determined location.

Upon failure to determine the location in the first time window that satisfies both the first uncertainty threshold and the first reliability threshold, the mobile device can start (706) a second timer that defines a second time window. In the second time window, the mobile device can attempt to determine a location of the mobile device that satisfies a second uncertainty threshold that is easier to satisfy, e.g., that has a value that is greater, than the first uncertainty threshold and a second reliability threshold that is easier to satisfy, e.g., that has a value that is greater, than the first reliability threshold. The second reliability threshold can be defined at least in part by a second number of wireless points that are observed by the mobile device, that are used by the mobile device to determine the location, and that are consistent with the determined location. The second number can be lower than the first number.

Upon successful determination of the location in the second time window, the mobile device can provide (708) the location (e.g., geographic coordinates), and a value representing uncertainty of the location (e.g., in meters), to a mobile network operator for submitting to the public service. In some implementations, the mobile device allows the first time window and the second time window that follows the first time window to close before providing the location to the network operator. Providing the location to the mobile network operator can include sending a SIP request, e.g., a SIP invite, that includes a header in which the location and an estimated uncertainty of the location.

In some implementations, providing the location to the mobile network operator can include sending a SIP request, e.g., a SIP update, that includes a header in which the location and an estimated uncertainty of the location. The mobile device can submit the SIP update after an emergency call has already started, e.g., after the mobile device already submitted a SIP invite request and received a response from the mobile network operator.

In some implementations, after both the first time window and the second time window close, the mobile device can disable a location function of the mobile device upon determining that, prior to receiving the user input for connecting the mobile device to a public service, the location function of the mobile device was in a disabled state. In some implementations, the mobile device can determine a direction of movement and a velocity of movement of the mobile device at time the mobile device receives the user input. The mobile device can then provide the direction and velocity to the mobile network operator for submission to the public service.

In some implementations, determining a location of the mobile device that satisfies the first reliability threshold or the second reliability threshold can include performing the following options. The mobile device can determine a satellite location of the mobile device using a satellite positioning subsystem. The mobile device can determine a wireless location of the mobile device using a wireless positioning subsystem. The mobile device can determine that the location of the mobile device is the wireless location, including determining that the wireless location is accurate upon determining that the wireless location is consistent with the satellite location. Determining that the wireless location is consistent with the satellite location can include determining that, although the satellite location is unavailable when the wireless location is determined, the wireless location is located within a threshold distance from the satellite location that is determined at an earlier time, e.g., X minutes ago.

Determining that the wireless location is accurate can include determining increasing a reliability value of the wireless location to a value that satisfies the first or second reliability threshold upon determining that the wireless location is consistent with the satellite location.

Figure 8:
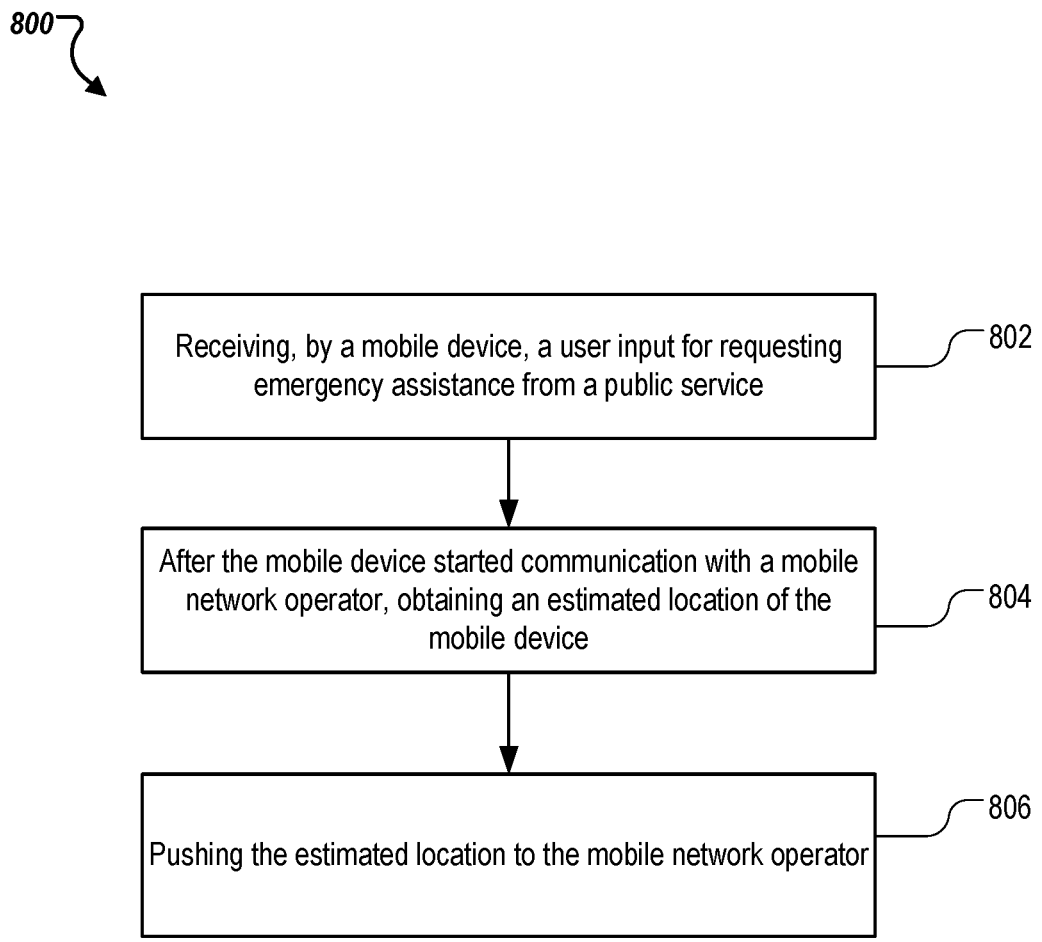
FIG. 8 is a flowchart of an exemplary process of providing location support for emergency calls.

FIG. 8 is a flowchart of an exemplary process 800 of providing location support in an emergency call. A mobile device, e.g., mobile device 102 of FIG. 1, can perform process 800.

The mobile device can receive (802) a user input for requesting emergency assistance from a public service. The user input can be dialing an emergency number on a keyboard of the mobile device.

After the mobile device started communication with a mobile network operator through a telephony subsystem to request the emergency assistance, the mobile device can obtain (804) an estimated location of the mobile device using a location subsystem of the mobile device.

Obtaining the estimated location can include triggering one or more available location functions of the mobile device. The one or more available location functions can include at least one of a passive wireless scanning (e.g., passive Wi-Fi™ scanning), wireless received signal strength (RSS) measurements for comparison with on-device wireless signal fingerprints, global navigation satellite system (GNSS) location determination (e.g., GPS or GLONASS location determination), or cellular identifier based location lookup.

Obtaining the estimated location can include determining a wireless location using a wireless positioning subsystem of the mobile device and determining the estimated location using a satellite positioning subsystem assisted by the wireless location.

Determining the wireless location can include scanning each of one or more wireless channels for a pre-specified period of time that is limited by a maximum permissible delay for making an emergency call. Determining a wireless location can also include the following operations. The mobile device can determine a candidate wireless location using wireless access points detected in the scanning and a local location database storing association of locations and the detected wireless points. The mobile device can determine that a degree of reliability of the candidate wireless location does not satisfy a reliability threshold. In response, the mobile device can submit a location query to a location server for additional location information on wireless access points. In the location query, a flag for requesting locations of wireless access points neighboring the detected wireless points is set to off. After receiving the additional location information, the mobile device can determine the wireless location using the additional location information.

While the mobile device is in communication with the mobile network operator, and without responding to a request for location from the mobile network operator, the mobile device can push (806) the estimated location to the mobile network operator. Pushing the estimated location can include encoding geographic coordinates of the location in a header in a session initiation protocol (SIP) update operation. The mobile device can initiate and control pushing the estimated location. For example, if the mobile device receives a request for location, the mobile device can ignore the received request.

Exemplary Mobile Device Architecture

Figure 9:
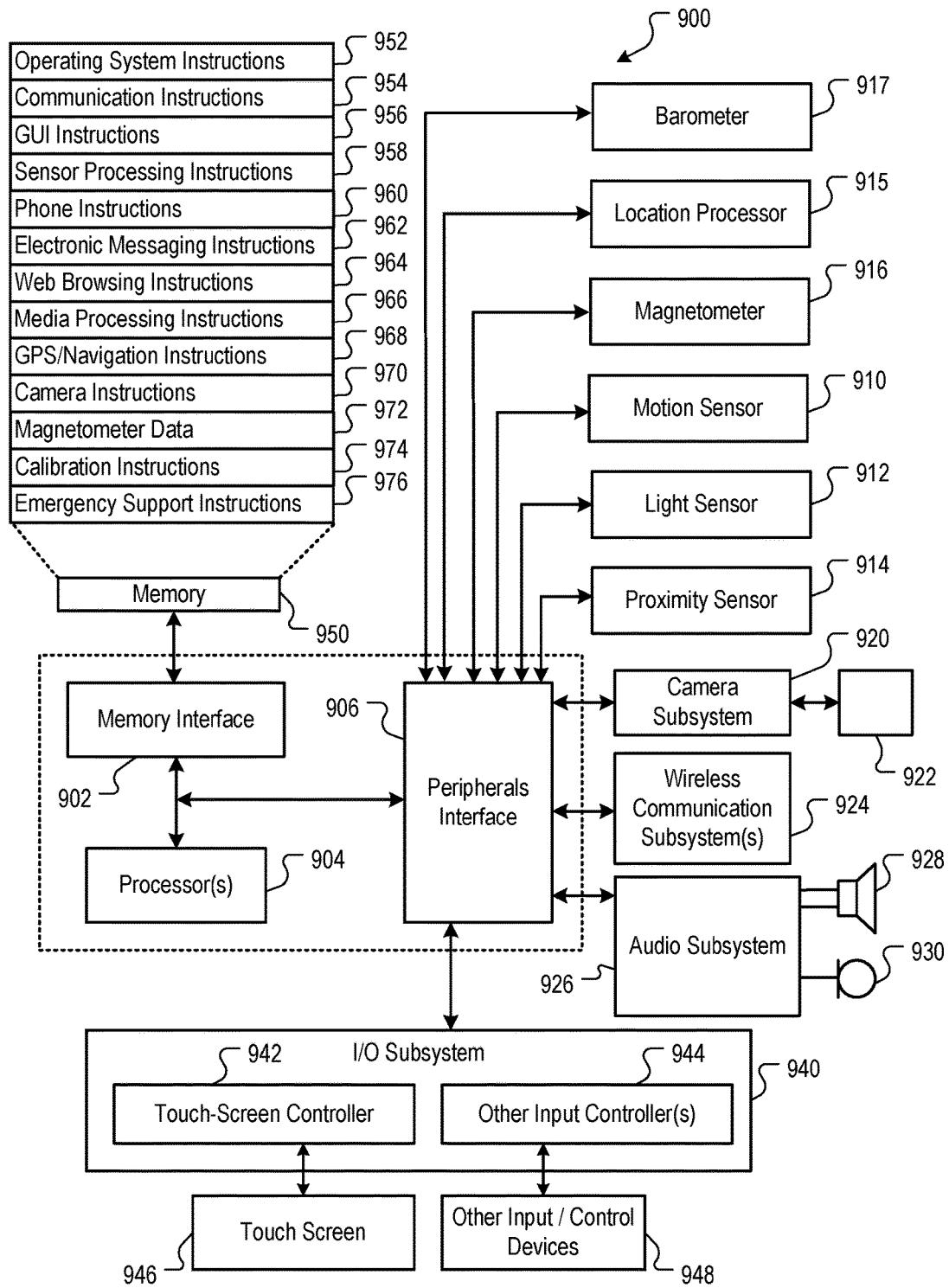
FIG. 9 is a block diagram illustrating an exemplary device architecture of a mobile device implementing the features and operations described in reference to FIGS. 1-8.

FIG. 9 is a block diagram of an exemplary architecture 900 for the mobile devices of FIGS. 1-8. A mobile device (e.g., mobile device 102) can include memory interface 902, one or more data processors, image processors and/or processors 904, and peripherals interface 906. Memory interface 902, one or more processors 904 and/or peripherals interface 906 can be separate components or can be integrated in one or more integrated circuits. Processors 904 can include application processors, baseband processors, and wireless processors. The various components in mobile device 102, for example, can be coupled by one or more communication buses or signal lines.

Sensors, devices and subsystems can be coupled to peripherals interface 906 to facilitate multiple functionalities. For example, motion sensor 910, light sensor 912 and proximity sensor 914 can be coupled to peripherals interface 906 to facilitate orientation, lighting and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Motion sensor 910 can include one or more accelerometers configured to determine change of speed and direction of movement of the mobile device. Barometer 917 can include one or more devices connected to peripherals interface 906 and configured to measure pressure of atmosphere around the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi™ or WiMax™ network, and a Bluetooth™ network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions. Audio subsystem 926 can be configured to receive voice commands from the user.

I/O subsystem 940 can include touch surface controller 942 and/or other input controller(s) 944. Touch surface controller 942 can be coupled to a touch surface 946 or pad. Touch surface 946 and touch surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 946. Touch surface 946 can include, for example, a touch screen.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch surface 946; and a pressing of the button for a second duration that is longer than the first duration may turn power to mobile device 102 on or off. The user may be able to customize a functionality of one or more of the buttons. The touch surface 946 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as iOS, Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; camera instructions 970 to facilitate camera-related processes and functions; magnetometer data 972 and calibration instructions 974 to facilitate magnetometer calibration. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950. Memory 950 can store emergency support instructions 976 that, when executed, can cause processor 904 to perform operations of providing location support to an emergency call, including the operations described in FIGS. 1-8.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
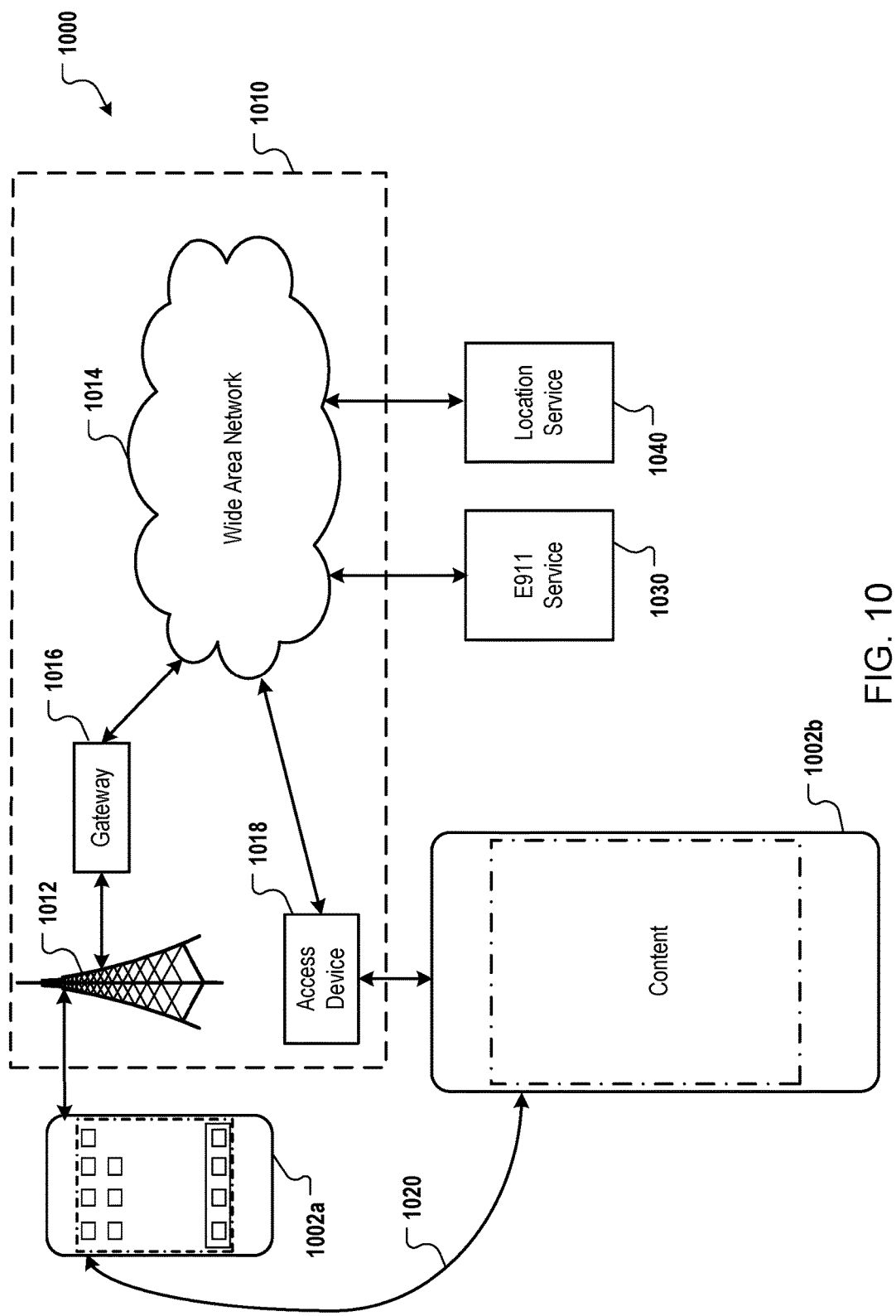
FIG. 10 is a block diagram of an exemplary network operating environment for the mobile devices of FIGS. 1-8.

FIG. 10 is a block diagram of an exemplary network operating environment 1000 for the mobile devices of FIGS. 1-8. Mobile devices 1002a and 1002b can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g or 802.11n wireless access point, can provide communication access to the wide area network 1014. Each of mobile devices 1002a and 1002b can be mobile device 102 as described above in reference to FIGS. 1-8.

In some implementations, both voice and data communications can be established over wireless network 1012 and the access device 1018. For example, mobile device 1002a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002b can place and receive phone calls, send and receive e-mail messages, and retrieve electronic documents over the access device 1018 and the wide area network 1014. In some implementations, mobile device 1002a or 1002b can be physically connected to the access device 1018 using one or more cables and the access device 1018 can be a personal computer. In this configuration, mobile device 1002a or 1002b can be referred to as a "tethered" device.

Mobile devices 1002a and 1002b can also establish communications by other means. For example, wireless device 1002a can communicate with other wireless devices, e.g., other mobile devices, cell phones, etc., over the wireless network 1012. Likewise, mobile devices 1002a and 1002b can establish peer-to-peer communications 1020, e.g., a personal area network, by use of one or more communication subsystems, such as the Bluetooth™ communication devices. Other communication protocols and topologies can also be implemented.

The mobile device 1002a or 1002b can, for example, communicate with one or more services 1030 and 1040 over the one or more wired and/or wireless networks. For example, one or more E911 services 1030 can provide support for emergency assistance when request by mobile devices 1002a and 1002b. Location service 1040 can provide the location data of wireless access points to mobile devices 1002a and 1002b for determining locations of the mobile devices 1002a and 1002b.

Mobile device 1002a or 1002b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1002a or 1002b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
receiving, at a mobile device, a request to access a public service;
detecting, by the mobile device, one or more wireless access points in proximity to the mobile device;
determining, by the mobile device for each of the detected wireless access points, a location associated with the detected wireless access point;
determining, by the mobile device, a consistency between the locations associated with the detected wireless access points, wherein determining the consistency between the locations associated with the detected wireless access points comprises:
determining that a number of detected wireless access points exceeds a threshold number; and
responsive to determining that the number of detected wireless access points exceeds the threshold number, determining that each of the locations associated with the detected wireless access points is consistent with each of the other locations associated with the detected wireless access points;
responsive to determining the consistency between the locations associated with the detected wireless access points, determining, by the mobile device, a location of the mobile device based on the locations associated with the detected wireless access points; and
transmitting, by the mobile device, the location of the mobile device to a network operator for submission to the public service.

2. The method of claim 1, wherein determining the location of the mobile device comprises averaging each of the locations associated with the detected wireless access points.

3. The method of claim 1, further comprising:
detecting, by the mobile device, one or more additional wireless access points in proximity to the mobile device;
determining, by the mobile device for each of the detected additional wireless access points, a location associated with the detected additional wireless access point;
determining, by the mobile device, a consistency between the locations associated with the detected additional wireless access points, wherein determining the consistency between the locations associated with the detected additional wireless access points comprises:
determining that a number of detected additional wireless access points exceeds the threshold number;
responsive to determining that the number of detected additional wireless access points exceeds the threshold number, determining that each of the locations associated with a subset of the detected additional wireless access points is consistent with each of the other locations associated with the subset of the detected additional wireless access points; and
determining that the subset of the detected additional wireless access points represents a percentage of the detected additional wireless access points greater than or equal to a threshold percentage, and
wherein determining the location of the mobile device comprises averaging each of the locations associated with the subset of the detected additional wireless access points.

4. The method of claim 1, further comprising:
detecting, by the mobile device, one or more additional wireless access points in proximity to the mobile device;
determining, by the mobile device for each of the detected additional wireless access points, a location associated with the detected additional wireless access point;
determining, by the mobile device, a consistency between the locations associated with the detected additional wireless access points, wherein determining the consistency between the locations associated with the detected additional wireless access points comprises:
determining that a number of detected additional wireless access points exceeds the threshold number;
responsive to determining that the number of detected additional wireless access points exceeds the threshold number, determining that each of the locations associated with a subset of the detected additional wireless access points is consistent with each of the other locations associated with the subset of the detected additional wireless access points; and
determining that the subset of the detected additional wireless access points represents a percentage of the detected additional wireless access points less than a threshold percentage, and
wherein determining the location of the mobile device comprises submitting a query to a remote location database for location information regarding each of the detected additional wireless access points.

5. The method of claim 1, further comprising:
detecting, by the mobile device, one or more additional wireless access points in proximity to the mobile device;
determining, by the mobile device for each of the detected additional wireless access points, a location associated with the detected additional wireless access point;
determining, by the mobile device, a consistency between the locations associated with the detected additional wireless access points, wherein determining the consistency between the locations associated with the detected additional wireless access points comprises determining that a number of detected additional wireless access points does not exceed the threshold number, and wherein determining the location of the mobile device comprises submitting a query to a remote location database for location information regarding each of the detected additional wireless access points.

6. The method of claim 5, wherein the query further comprises a request to the remote location database for location information regarding one or more further wireless access points neighboring the detected additional wireless access points.

7. The method of claim 5, wherein the query further comprises a request to the remote location database to not provide location information regarding one or more further wireless access points neighboring the detected additional wireless access points to the mobile device.

8. The method of claim 1, further comprising determining a location of the mobile device using a satellite positioning system in parallel to detecting the one or more wireless access points in proximity to the mobile device.

9. The method of claim 1, further comprising attempting to determine a location of the mobile device using a satellite positioning system, and wherein detecting the one or more wireless access points in proximity to the mobile device is performed responsive to determining that the location of the mobile device cannot be determined using the satellite positioning system.

10. The method of claim 1, wherein the public service is an emergency service, and wherein the mobile device is connected to the public service through an E911 system, a T911 system, a 112 system, or a 119 system.

11. A non-transitory computer-readable medium including one or more sequences of instructions which, when executed by one or more processors, causes:

receiving, at a mobile device, a request to access a public service;

detecting, by the mobile device, one or more wireless access points in proximity to the mobile device;

determining, by the mobile device for each of the detected wireless access points, a location associated with the detected wireless access point;

determining, by the mobile device, a consistency between the locations associated with the detected wireless access points, wherein determining the consistency between the locations associated with the detected wireless access points comprises:

determining that a number of detected wireless access points exceeds a threshold number; and responsive to determining that the number of detected wireless access points exceeds the threshold number, determining that each of the locations associated with the detected wireless access points is consistent with each of the other locations associated with the detected wireless access points;

responsive to determining the consistency between the locations associated with the detected wireless access points, determining, by the mobile device, a location of the mobile device based on the locations associated with the detected wireless access points; and transmitting, by the mobile device, the location of the mobile device to a network operator for submission to the public service.

12. The non-transitory computer-readable medium of claim 11, wherein determining the location of the mobile device comprises averaging each of the locations associated with the detected wireless access points.

13. The non-transitory computer-readable medium of claim 11, wherein the one or more sequences of instructions, when executed by one or more processors, further causes:

detecting, by the mobile device, one or more additional wireless access points in proximity to the mobile device;

determining, by the mobile device for each of the detected additional wireless access points, a location associated with the detected additional wireless access point;

determining, by the mobile device, a consistency between the locations associated with the detected additional wireless access points, wherein determining the consistency between the locations associated with the detected additional wireless access points comprises:

determining that a number of detected additional wireless access points exceeds the threshold number;

responsive to determining that the number of detected additional wireless access points exceeds the threshold number, determining that each of the locations associated with a subset of the detected additional wireless access points is consistent with each of the other locations associated with the subset of the detected additional wireless access points; and determining that the subset of the detected additional wireless access points represents a percentage of the detected additional wireless access points greater than or equal to a threshold percentage, and wherein determining the location of the mobile device comprises averaging each of the locations associated with the subset of the detected additional wireless access points.

14. The non-transitory computer-readable medium of claim 11, wherein the one or more sequences of instructions, when executed by one or more processors, further causes:

detecting, by the mobile device, one or more additional wireless access points in proximity to the mobile device;

determining, by the mobile device for each of the detected additional wireless access points, a location associated with the detected additional wireless access point;

determining, by the mobile device, a consistency between the locations associated with the detected additional wireless access points, wherein determining the consistency between the locations associated with the detected additional wireless access points comprises:

determining that a number of detected additional wireless access points exceeds the threshold number;

responsive to determining that the number of detected additional wireless access points exceeds the threshold number, determining that each of the locations associated with a subset of the detected additional wireless access points is consistent with each of the other locations associated with the subset of the detected additional wireless access points; and determining that the subset of the detected additional wireless access points represents a percentage of the detected additional wireless access points less than a threshold percentage, and wherein determining the location of the mobile device comprises submitting a query to a remote location database for location information regarding each of the detected additional wireless access points.

15. The non-transitory computer-readable medium of claim 11, wherein the one or more sequences of instructions, when executed by one or more processors, further causes:

detecting, by the mobile device, one or more additional wireless access points in proximity to the mobile device;
determining, by the mobile device for each of the detected additional wireless access points, a location associated with the detected additional wireless access point;
determining, by the mobile device, a consistency between the locations associated with the detected additional wireless access points, wherein determining the consistency between the locations associated with the detected additional wireless access points comprises determining that a number of detected additional wireless access points does not exceed the threshold number, and
wherein determining the location of the mobile device comprises submitting a query to a remote location database for location information regarding each of the detected additional wireless access points.

16. The non-transitory computer-readable medium of claim 15, wherein the query further comprises a request to the remote location database for location information regarding one or more further wireless access points neighboring the detected additional wireless access points.

17. The non-transitory computer-readable medium of claim 15, wherein the query further comprises a request to the remote location database to not provide location information regarding one or more further wireless access points neighboring the detected additional wireless access points to the mobile device.

18. The non-transitory computer-readable medium of claim 11, wherein the one or more sequences of instructions, when executed by one or more processors, further causes determining a location of the mobile device using a satellite positioning system in parallel to detecting the one or more wireless access points in proximity to the mobile device.

19. The non-transitory computer-readable medium of claim 11, wherein the one or more sequences of instructions, when executed by one or more processors, further causes attempting to determine a location of the mobile device using a satellite positioning system, and
wherein detecting the one or more wireless access points in proximity to the mobile device is performed responsive to determining that the location of the mobile device cannot be determined using the satellite positioning system.

20. The non-transitory computer-readable medium of claim 11, wherein the public service is an emergency service, and wherein the mobile device is connected to the public service through an E911 system, a T911 system, a 112 system, or a 119 system.

21. A system comprising:
one or more processors; and
a non-transitory computer-readable medium including one or more sequences of instructions which, when executed by the one or more processors, causes:
receiving, at a mobile device, a request to access a public service;
detecting, by the mobile device, one or more wireless access points in proximity to the mobile device;
determining, by the mobile device for each of the detected wireless access points, a location associated with the detected wireless access point;
determining, by the mobile device, a consistency between the locations associated with the detected wireless access points, wherein determining the consistency between the locations associated with the detected wireless access points comprises:
determining that a number of detected wireless access points exceeds a threshold number; and
responsive to determining that the number of detected wireless access points exceeds the threshold number, determining that each of the locations associated with the detected wireless access points is consistent with each of the other locations associated with the detected wireless access points;
responsive to determining the consistency between the locations associated with the detected wireless access points, determining, by the mobile device, a location of the mobile device based on the locations associated with the detected wireless access points; and
transmitting, by the mobile device, the location of the mobile device to a network operator for submission to the public service.

22. The system of claim 21, wherein determining the location of the mobile device comprises averaging each of the locations associated with the detected wireless access points.

23. The system of claim 21, wherein the one or more sequences of instructions, when executed by one or more processors, further causes:
detecting, by the mobile device, one or more additional wireless access points in proximity to the mobile device;
determining, by the mobile device for each of the detected additional wireless access points, a location associated with the detected additional wireless access point;
determining, by the mobile device, a consistency between the locations associated with the detected additional wireless access points, wherein determining the consistency between the locations associated with the detected additional wireless access points comprises:
determining that a number of detected additional wireless access points exceeds the threshold number;
responsive to determining that the number of detected additional wireless access points exceeds the threshold number, determining that each of the locations associated with a subset of the detected additional wireless access points is consistent with each of the other locations associated with the subset of the detected additional wireless access points; and
determining that the subset of the detected additional wireless access points represents a percentage of the detected additional wireless access points greater than or equal to a threshold percentage, and
wherein determining the location of the mobile device comprises averaging each of the locations associated with the subset of the detected additional wireless access points.

24. The system of claim 21, wherein the one or more sequences of instructions, when executed by one or more processors, further causes:
detecting, by the mobile device, one or more additional wireless access points in proximity to the mobile device;
determining, by the mobile device for each of the detected additional wireless access points, a location associated with the detected additional wireless access point;
determining, by the mobile device, a consistency between the locations associated with the detected additional wireless access points, wherein determining the consistency between the locations associated with the detected additional wireless access points comprises:
determining that a number of detected additional wireless access points exceeds the threshold number;

responsive to determining that the number of detected additional wireless access points exceeds the threshold number, determining that each of the locations associated with a subset of the detected additional wireless access points is consistent with each of the other locations associated with the subset of the detected additional wireless access points; and determining that the subset of the detected additional wireless access points represents a percentage of the detected additional wireless access points less than a threshold percentage, and wherein determining the location of the mobile device comprises submitting a query to a remote location database for location information regarding each of the detected additional wireless access points.

25. The system of claim 21, wherein the one or more sequences of instructions, when executed by one or more processors, further causes:

detecting, by the mobile device, one or more additional wireless access points in proximity to the mobile device;

determining, by the mobile device for each of the detected additional wireless access points, a location associated with the detected additional wireless access point;

determining, by the mobile device, a consistency between the locations associated with the detected additional wireless access points, wherein determining the consistency between the locations associated with the detected additional wireless access points comprises determining that a number of detected additional wireless access points does not exceed the threshold number, and wherein determining the location of the mobile device comprises submitting a query to a remote location database for location information regarding each of the detected additional wireless access points.

26. The system of claim 25, wherein the query further comprises a request to the remote location database for location information regarding one or more further wireless access points neighboring the detected additional wireless access points.

27. The system of claim 25, wherein the query further comprises a request to the remote location database to not provide location information regarding one or more further wireless access points neighboring the detected additional wireless access points to the mobile device.

28. The system of claim 21, wherein the one or more sequences of instructions, when executed by the one or more processors, further causes determining a location of the mobile device using a satellite positioning system in parallel to detecting the one or more wireless access points in proximity to the mobile device.

29. The system of claim 21, wherein the one or more sequences of instructions, when executed by the one or more processors, further causes attempting to determine a location of the mobile device using a satellite positioning system, and wherein detecting the one or more wireless access points in proximity to the mobile device is performed responsive to determining that the location of the mobile device cannot be determined using the satellite positioning system.

30. The system of claim 21, wherein the public service is an emergency service, and wherein the mobile device is connected to the public service through an E911 system, a T911 system, a 112 system, or a 119 system.

* * * * *